Feb. 3, 1942.     E. T. SLAYTON     2,271,781
GEAR CUTTER
Filed June 28, 1939     2 Sheets-Sheet 1

Ensign T. Slayton
INVENTOR

BY B. F. Schlesinger
ATTORNEY

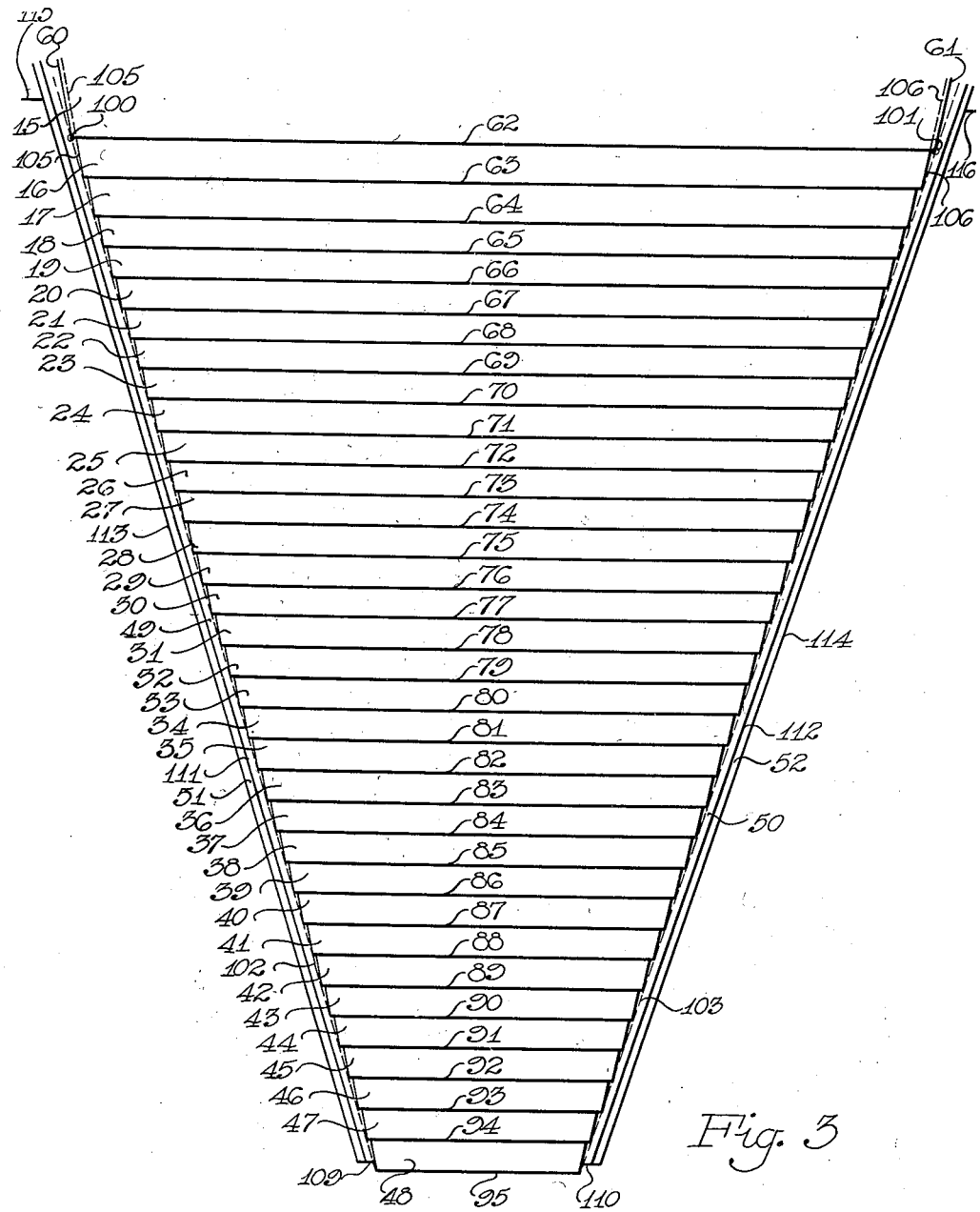

Patented Feb. 3, 1942

2,271,781

UNITED STATES PATENT OFFICE 2,271,781

GEAR CUTTER

Ensign T. Slayton, Irondequoit, N. Y., assignor to Gleason Works, Rochester, N. Y., a corporation of New York Application June 28, 1939, Serial No. 281,563

8 Claims. (Cl. 29—105)

The present invention relates to the production of gears and particularly to the cutting of longitudinally curved tooth gears such as spiral bevel and hypoid gears of the "formate" (non-generated) type.

A primary purpose of the invention is to provide a cutter which is capable of successively rough and finish-cutting the tooth spaces of a spiral bevel or hypoid gear.

A further purpose of the invention is to provide a cutter of the face-mill type which is capable in a single revolution of finishing a tooth space of a spiral bevel or hypoid gear from the solid to a smoothness and accuracy equal to that heretofore obtained only by separate rough and finish-cutting operations.

Other objects of the invention will be apparent hereinafter from the specification and from the recital of the appended claims.

In the drawings:

Fig. 3 is a diagrammatic view on an enlarged scale showing the several blades of the cutter superimposed on one another and illustrating the cutting action of the cutter.

Figure 1:
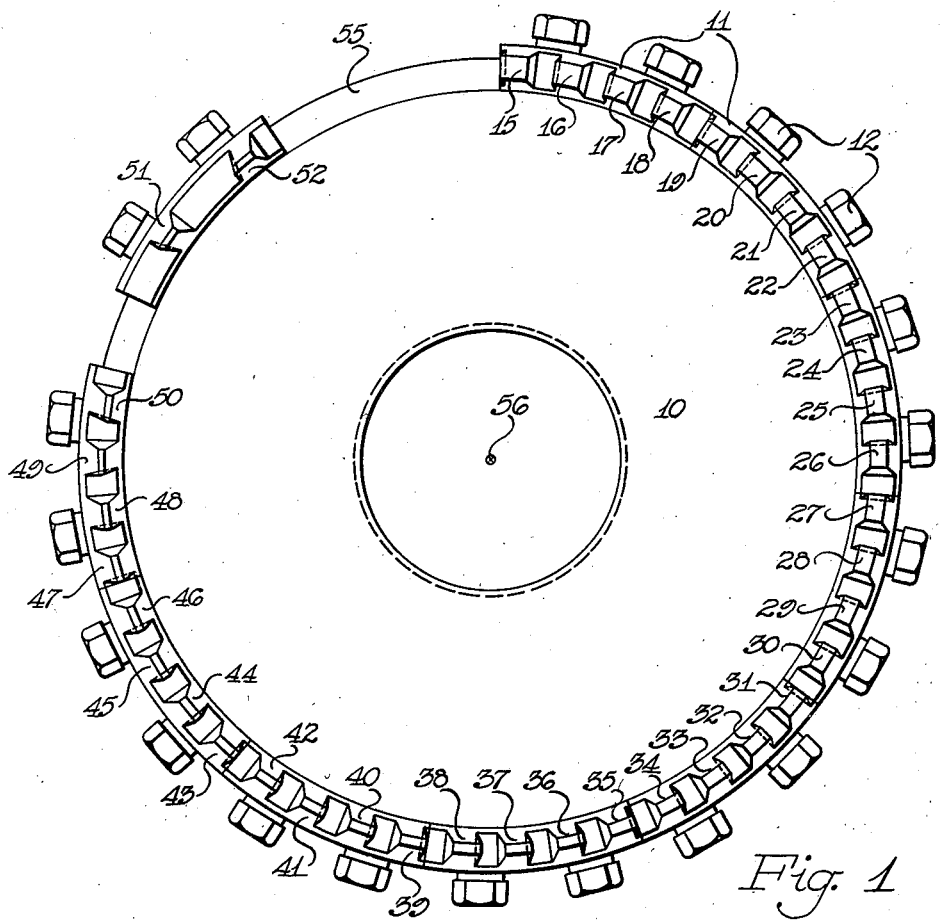
Fig. 1 is a plan or face view of a gear cutter made according to one embodiment of this invention.

A completing cutter constructed according to the present invention is provided with a plurality of roughing blades of progressively increasing height to cut progressively deeper into a tooth space of a gear blank to the full depth of the tooth space as a limit. These blades serve to take the stock out of the tooth space. They may be followed by one or more semi-finishing blades which cut for substantially the full height of the tooth space and serve to widen out the tooth space. These are followed by the final finishing blade or blades which serves or serve to produce the final finished tooth space width and shape and to provide the smooth tooth surface finish required on the sides of the gear teeth.

The cutter is preferably made of the "single cycle" type, that is, its blades are arranged partway only around its periphery and a gap is provided between the last and first blades which is of sufficient angular extent to permit of indexing the blank, when the gap in the cutter is abreast of the blank, without relative separation of the cutter and blank.

Successive roughing blades are made of progressively decreasing point width, but instead of making the sides of these blades of the same pressure angle as the finishing blades, that is, as the sides of the tooth space to be finished, the blades are made with sides of somewhat smaller pressure angle. The point-width is so proportioned to the height of successive blades that the points of intersection of the corresponding sides of successive blades with the tops of those blades lie in a line parallel to the finished sides of the tooth space. The roughing blades will then cut in the aggregate a roughed tooth slot corresponding generally in shape and pressure angle to the finished tooth space but of less width than the finished tooth space. Since the sides of the roughing blades are of smaller pressure angle than the pressure angles of opposite sides of the tooth slot, however, each succeeding roughing blade will clear the sides of the slot cut by the preceding roughing blade. Thus breakage or dulling of the roughing blades will be avoided and their life prolonged. A blade which cuts on both sides and its tip simultaneously tends to dull rapidly and does not cut clean. Through the use of smaller pressure angles on the sides of the roughing blades while their tips develop surfaces of greater pressure angle, the blades will cut freer, more smoothly and have longer life.

The roughing blades will leave a roughed tooth slot whose sides are serrated but the semi-finishing blades of the cutter will remove the serrations and the final finishing blades of the cutter will produce a finished tooth space of the desired width and having side surfaces of the desired smoothness and pressure angle.

With a "single-cycle" type of cutter, the cutter is adjusted into engagement with the gear blank to be cut so that its blades will cut to the full depth of the tooth spaces of the blank without relative depthwise feed movement between cutter and blank. The cutter is rotated continuously in engagement with the blank, the blank is held stationary on its axis during cutting, and the blank is indexed when the gap in the cutter is abreast of the blank. When the cutter has made as many revolutions, then, as there are tooth spaces in the gear to be cut, the gear will be finished.

Reference will now be had to the drawings for a more detailed description of the invention.

10 denotes the body or head of a face-mill gear cutter constructed according to one embodiment of this invention. The cutter shown is of the segmental type and there are a plurality of cutting segments 11 secured to the periphery of the cutter head by bolts 12. Each segment is provided with a plurality of cutting teeth or blades. These are denoted at 15 to 52 inclusive.

The cutting blades are arranged part-way only around the periphery of the cutter head 10 and there is a peripheral gap 55 between the last blade 52 and the first blade 15. This gap is of sufficient angular extent to permit of indexing a gear blank, when the gap is abreast of the blank in the rotation of the cutter, without relative separation of the cutter and blank. The cutting blades, of course, project beyond one side face of the head in the general direction of the axis 56 of the head.

The blades 15 to 48 inclusive are roughing blades. The blades 49 and 50 are semi-finishing blades and the blades 51 and 52 are the final finishing blades.

The roughing blades are made of progressively increasing height but of progressively decreasing point-width. Their construction is illustrated clearly in Figs. 2 and 3.

The first roughing blade 15 projects but a slight distance from the face of the cutter head so that it takes only a shallow cut in a tooth space of the gear blank to be finished. The top-cutting edge of this blade is denoted at 62 and its sides at 60 and 61. The next roughing blade 16 projects beyond the face of the cutter head further than the preceding blade 15 but its point-width is less than that of the blade 15, that is, its top-cutting edge 63 is narrower than the top-cutting edge 62 of the blade 15. Similarly, the next succeeding blade 17 projects further from the face of the cutter head than the blade 16 but its top-cutting edge 64 is of less point-width than the top-cutting edge 63 of the blade 16.

So it is for all the rest of the roughing blades. Each successive roughing blade projects beyond the face of the cutter head a greater distance than the preceding roughing blade, but each successive roughing blade has a point-width less than that of the preceding roughing blade. The various roughing blades are shown superimposed upon one another in Fig. 3 and their top-cutting edges are denoted at 62–95 inclusive.

The point-widths and heights of successive roughing blades are so proportional to one another, that in the aggregate these blades will rough out a tooth slot having the general shape and pressure angle of the finished tooth space. 100 denotes the point of intersection of one side 60 of the roughing blade 15 with the top-cutting edge 62 of that blade. 101 denotes the point of intersection of the opposite side-cutting edge 61 of that blade with the top-cutting edge 62. These points 100 and 101 lie on lines 102 and 103, respectively, and the point-widths and heights of successive roughing blades are so chosen that the points of intersection of their opposite side-cutting edges with their top-cutting edges also lie on the lines 102 and 103, respectively. These lines have the profile shapes of and are inclined to one another at an angle corresponding to the sides of the finished tooth space which is to be cut. They are spaced from one another, however, a distance somewhat less than the finished width of the tooth space because the roughing blades are intended to leave stock on the sides of the tooth space to be cleaned up by the semi-finishing and the finishing blades.

The side surfaces of the roughing blades are made with pressure angles less than the pressure angles of the sides of the tooth spaces to be cut. Thus, the opposite sides 60 and 61 of the blade 15 have a pressure angle or inclination less than the pressure angle or inclination of the lines 102 and 103. Similarly, the opposite sides of the succeeding roughing blades have, respectively, pressure angles less than the lines 102 and 103 and preferably equal to the pressure angles of the sides 60 and 61 of the blade 15.

The sides 60 and 61 of the first roughing blade 15 will, of course, cut for the full depth of their engagement with the gear blank but since this first blade is designed to take only a shallow cut, the load on this blade will not be excessive and it will not be subject to undue wear. The sides 105 and 106 of the next blade 16 being less inclined to the axis of the cutter than the inclination of the lines 102 and 103 will clear the sides of the cuts taken by the blade 15, as shown clearly by the dotted lines in Fig. 3. The sides of the blade 16 will cut, then, for only that portion of their height which projects beyond the blade 15. Similarly, the sides of each succeeding roughing blade will clear the cut taken by the sides of the preceding blade and will cut for only that portion of their height which projects beyond the immediately preceding blade. By making the blades in this way, then, the opposite side-cutting edges of each successive roughing blade will clear the sides of the cut taken by the preceding roughing blade. There will be no rubbing of the sides of one blade along the sides of the slot cut by the preceding blade. Thus, dulling of the blades is avoided and, with the higher blades particularly, also any possibility of breakage.

The final roughing blade 48 is of a height to cut to the full depth of the tooth space but its point-width, of course, is slightly less than the finished width of the tooth space at its bottom, as already indicated.

Figure 2:
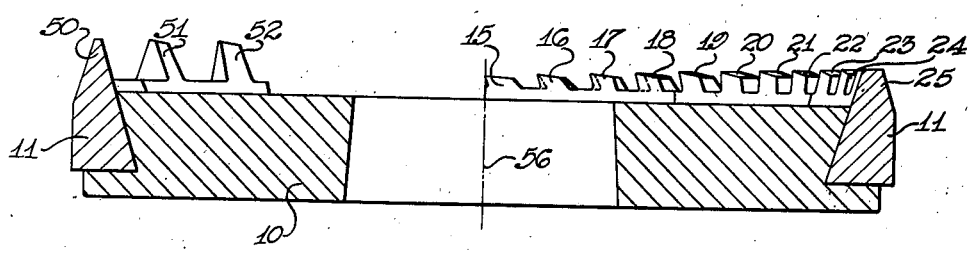
Fig. 2 is a transverse sectional view of this cutter.

The roughing blades are preferably sharpened with a "hook," as clearly shown in Fig. 2 so, that each roughing blade will have cutting edges at opposite sides, but the semi-finishing blades 49 and 50 and the finishing blades 51 and 52 are preferably sharpened with side rake so that each will cut at one side only of the tooth space. Thus, as shown in Fig. 1, the semi-finishing blade 49 and the finishing blade 51 are sharpened to have outside cutting edges and the semi-finishing blade 50 and the finishing blade 52 are sharpened to have inside cutting edges.

The two semi-finishing blades are made of a height to cut substantially the full depth of the roughed tooth slot although they may be made some few thousandths of an inch shorter than the final roughing blade 48 so that their top edges 109 and 110 will not rub on the bottom of the tooth space.

The semi-finishing blades are provided to clean up the serrated roughed tooth slots produced by the roughing blades and to slightly widen out the slots. For this purpose their side-cutting edges 111 and 112 are offset radially outwardly and inwardly, respectively, with reference to the corresponding side-cutting edges of the roughing blades. The pressure angles of the side-cutting edges of the semi-finishing blades are preferably made equal to the pressure angles of the opposite sides of the tooth space, so that their cutting edges 111 and 112 will be parallel, respectively, to the lines 102 and 103.

The semi-finishing blades are followed by the finishing blades 51 and 52. The opposite side-cutting edges of these blades have the same pressure angles, respectively, as the sides of the tooth space to be finish-cut and they are offset radially outwardly and inwardly, respectively, relative to the opposite side-cutting edges of the semi-finishing blades so as to take the final finishing cuts. Thus, the outside-cutting edge 113 of the blade 51 is disposed at a greater radial distance from the axis 56 of the cutter than the corresponding side-cutting edge 111 of the semi-finishing blade 49 and the inside-cutting edge 114 of the final finishing blade 52 is disposed closer to the axis 56 of the cutter than the inside-cutting edge 112 of the blade 50. Thus, the final finishing blades 51 and 52 will take thin chips from the concave and convex sides, respectively, of the tooth slot producing the final finished side surfaces of the tooth space. The lines 113 and 114 in Fig. 3 denote, therefore, not only the sides of the finishing blades but also the sides of the finished tooth space. 115 and 116 denote the tops of the adjacent teeth.

The blades 51 and 52, like the blades 49 and 50 are preferably made somewhat shorter than the final roughing blade 48, so that their tops, too, will not rub in the bottom of the roughed tooth space. Possibility of chatter is thereby avoided during the final finshing cut on opposite sides of the tooth space, ensuring a smooth tooth surface finish and accuracy of tooth spacing.

To further ensure smooth finishing cuts by the final blades, the blade 51 is preferably spaced, as shown, from the preceding blade 50 a distance greater than the face-width of the gear to be cut and similarly the blade 52 is spaced angularly from the preceding blade 51 a distance greater than the face-width of the gear to be cut. Thus, when either the blade 51 or the blade 52 is cutting, there will be only one blade of the cutter in operation and the final finishing blades will be able to take smooth, sweeping cuts unaffected by the cutting action of any other blade.

All of the blades, roughing, semi-finishing and finishing blades are relieved on their side and top faces back of their front faces to provide cutting clearance.

In the cutter illustrated in the drawings, not only do the top-cutting edges of successive roughing blades lie at constantly increasing distances from the face of the cutter head, but the blades themselves are of constantly increasing height. They might, however, be made all of the same height by sharpening them to the same depth as, for instance, to a depth but slightly greater than the amount one blade projects beyond the preceding blade. With this arrangement, the bottoms of the grooves between successive roughing blades would lie in a helical surface parallel to the helical surface containing the top-cutting edges of these blades.

In the embodiment of the invention illustrated, the roughing blades are of uniformly increasing height. It will be understood, however, that they might, if desired, be made so that the top-cutting edges of successive blades would extend at progressively varying distances from the face of the cutter head so as to proportion the chip-load on successive blades in accordance with the points at which they are to cut.

It will be understood, further, that while in the embodiment illustrated, the point-widths of successive blades successively decrease at a uniform rate, the point-width might be changed at a varying rate.

It will further be understood that while the invention is shown in connection with a cutter for cutting a tooth slot whose side surfaces are of straight profile, the invention is also applicable to the cutting of gears having teeth of curved profile. In this case, the point-width and height of the roughing blades might be progressively varied to cut a roughed tooth slot of generally curved profile conforming to the curved finished profile which it is desired to produce.

Still further, it will be understood that while the invention has been illustrated in connection with a completing cutter for successively rough and finish-cutting the tooth slots of a gear, cutters may be made according to the invention for rough-cutting only. In this case, the semi-finishing and finishing blades are omitted from the cutter head.

In general it may be said that while the invention has been described in connection with a particular embodiment thereof, it is to be understood that it is capable of further modification and use and this application is intended to cover any variations, uses, or adaptations of the invention following, in general, the principles of the invention and including such departure from the present disclosure as come within known or customary practice in the art and as may be applied to the essential features hereinbefore set forth and as fall within the scope of the invention or the limits of the appended claims.

Having thus described my invention, what I claim is:

1. A rotary gear cutter having a plurality of cutting blades of progressively increasing height and progressively decreasing point-width, said blades having side and top-cutting edges, the points of intersection of the top and corresponding side-cutting edges of said blades, when projected into a common radial plane, lying on a line having substantially the same profile shape as that of the tooth surfaces to be cut, and the side-cutting edges of said blades being inclined to said line.

2. A rotary gear cutter having a plurality of roughing blades of varying height and varying point width, the points of intersection of the top and corresponding side cutting edges of said blades, when projected into a common radial plane lying on a line having a positive inclination to the axis of the cutter, the corresponding side cutting edges of said blades having smaller positive inclination to said axis than said line.

3. A gear cutter comprising a rotary head and a plurality of cutting blades which project beyond one side face of the head in the general direction of the axis of the head and which are arranged at equal radial distances from the axis of the head but part-way only around the periphery of the head with a gap between the last and first blades, certain of the blades being of progressively increasing height and progressively decreasing point width to rough-cut a tooth space of a gear blank, and the following blades having opposite side-cutting edges which are offset radially inwardly and outwardly, respectively, with reference to the side-cutting edges of the first-named blade to finish-cut the tooth space, the side cutting edges of the roughing blades having smaller pressure angles than the corresponding side cutting edges of the finishing blades, and the gap being of sufficient angular extent to permit of indexing the gear blank, when the gap is abreast of the blank, without relative separation of the cutter and blank.

4. A face-mill gear cutter having a plurality of cutting blades of progressively increasing height and progressively decreasing point-width followed by a plurality of blades which are of uniform height but whose opposite side-cutting edges are offset radially with reference to the opposite side-cutting edges of the preceding blades, the last-named blades having pressure angles equal to the pressure angles of the opposite sides of the finished tooth space to be cut, and the first-named blades having their point-widths and heights proportioned to rough-cut a tooth slot whose sides have pressure angles corresponding generally to those of the finished tooth space, but said first-named blades having side surfaces whose pressure angles are less than the pressure angles of said finished tooth space.

5. A face-mill gear cutter having a plurality of roughing blades followed by a plurality of finishing blades arranged at equal radial distances from its axis but part-way only around its periphery with a gap between the last and first blades which is of sufficient angular extent to permit of indexing a gear blank, when the gap is abreast of the blank, without relative separation of the cutter and blank, the finishing blades having pressure angles and profile shapes equal to the pressure angles and profile shapes of the finished tooth spaces, opposite side-cutting edges of the finishing blades being offset radially inwardly and outwardly, respectively, with reference to corresponding side-cutting edges of the roughing blades, the roughing blades being of progressively increasing height and progressively decreasing point width to rough-cut a tooth space corresponding generally in shape to the finished tooth space, the pressure angles of the opposite sides of the roughing blades being less than the pressure angles of the corresponding sides of the finishing blades.

6. A rotary gear cutter having a plurality of roughing blades of such contsantly increasing height and constantly decreasing point-width that the points of intersection of the tops and opposite side-cutting edges of the blades, when projected into a common radial plane, lie on lines inclined at positive pressuure angles to the axis of the cutter, opposite side-cutting edges of said blades having positive pressure angles which are less inclined to the axis of the cutter than the aforesaid lines.

7. A face-mill gear cutter comprising a rotary head and a plurality of roughing blades which project beyond one side face of the head in the general direction of the axis of the head and are arranged at equal distances from the axis of the head, successive blades being of progressively decreasing point-widths and having their top-cutting edges disposed at progressively increasing distances from the face of the cutter head, so that the points of intersection of the top and opposite side-cutting edges of the blades, when projected into a common radial plane, lie on lines inclined at positive pressure angles to the axis of the cutter opposite side-cutting edges of said blades having pressure angles less than the positive pressure angles of the aforesaid lines.

8. A face-mill gear cutter comprising a rotary head and a plurality of roughing blades followed by a plurality of semi-finishing blades and a plurality of finishing blades, said blades being arranged at equal radial distances from the axis of the head but part-way only around the periphery of the head with a gap between the last and first blades which is of sufficient angular extent to permit of indexing a gear blank, when the gap is abreast of the blank, without relative separation of the cutter and blank, the roughing blades being of progressively increasing height and progressively decreasing point-width, the semi-finishing blades having outside cutting edges which are offset radially outwardly and inside cutting edges which are offset radially inwardly with reference to the corresponding side-cutting edges of the roughing blades, the finishing blades having outside and inside cutting edges offset radially outwardly and inwardly, respectively, with reference to the corresponding side-cutting edges of the semi-finishing blades, and the side-cutting edges of the roughing blades being of smaller pressure angle than the side-cutting edges of the finishing blades.

ENSIGN T. SLAYTON.